United States Patent [19]
Behr et al.

[11] 4,117,513
[45] Sep. 26, 1978

[54] CAMERA HAVING A TELESCOPING HOUSING

[75] Inventors: Karl-Günter Behr; Helmut Knapp, both of Biebertal, Fed. Rep. of Germany

[73] Assignee: Minox GmbH, Giessen, Fed. Rep. of Germany

[21] Appl. No.: 737,428

[22] Filed: Nov. 1, 1976

[30] Foreign Application Priority Data

Oct. 31, 1975 [DE] Fed. Rep. of Germany ....... 2548768

[51] Int. Cl.² ............................................. G03B 17/04
[52] U.S. Cl. .................................................. 354/187
[58] Field of Search ............... 354/187, 289, 190, 219, 354/223, 288, 53, 57

[56] References Cited

U.S. PATENT DOCUMENTS

| 2,213,942 | 9/1940 | Riszdorfer | 354/57 |
| 3,987,469 | 10/1976 | Winkler et al. | 354/187 |

FOREIGN PATENT DOCUMENTS

| 729,935 | 1/1943 | Fed. Rep. of Germany | 354/53 |
| 1,404,702 | 9/1975 | United Kingdom | 354/187 |

*Primary Examiner*—Donald A. Griffin
*Attorney, Agent, or Firm*—Edmund M. Jaskiewicz

[57] ABSTRACT

A camera has a telescoping housing and an optical viewfinder. A pivotable or sliding member indicates certain data which may be in the nature of exposure information. The member for setting the data is operatively connected to the indicating member in such a manner that the indicating member is additionally pivoted or slid upon telescoping of the housing and the indicating means returns to its previous indicating position upon extension of the telescoped housing.

10 Claims, 4 Drawing Figures

CAMERA HAVING A TELESCOPING HOUSING

The present invention relates to a camera having a telescoping housing and an optical viewfinder in which data is indicated, more particularly, to data indicating structure which moves into the data indicating position upon extension of the camera housing.

A known form of a camera comprises a telescoping housing and an optical viewfinder in which certain data which may be preset into the camera and which may relate to exposure information is indicated in the viewfinder. The data is generally indicated by various forms of electrical signal lights since particularly in subminiature cameras wherein the viewfinder elements are mounted in the movable housing part it is difficult to mount in the camera any other elements that would permit a telescoping of the housing. In general, this type of camera required expensive slide contacts with respect to the movable housing parts in order to transmit the indicated data and these contacts frequently led to failures in indicating the data because of soiling of the contacts.

It is therefore the principal object of the present invention to provide a novel and improved data indicating arrangement for a camera having a telescoping housing and a viewfinder in which the data is indicated.

It is an additional object of the present invention to provide such a data indicating arrangement which is simple in structure, effective and operation and inexpensive to fabricate.

It is a further object of the present invention to provide a mechanical data indicating structure for such a camera which does not hinder in any way the telescoping of the camera housing even in subminiature cameras.

The objects of the present invention are achieved and the disadvantages of the prior art are eliminated by the present invention which essentially provides a mechanical pivotable or displaceably mounted indicating member that is operatively connected to the displaceable housing part and subjected to additional pivoting or sliding movement upon telescoping of the displaceable housing part. The indication means according to the present invention indicates data in the viewfinder by normal pivoting or sliding movements and is additionally pivoted or displaced when the camera is telescoped together. The elements of the indicating structure assume a position upon telescoping of the housing that does not hinder in any way the telescoping of the housing.

According to one aspect of the present invention such a camera may comprise a telescoping housing having a housing part displaceable between telescoped and extended positions, an optical viewfinder is provided in the housing and one of pivotable or sliding members indicates data in the viewfinder. The indicating means are operatively connected to the displaceable housing part for additional pivoting or sliding of the indicating means upon telescoping of the displaceable housing part to the telescoped position.

A suitable spring may be provided to move the data indicating elements into the indicating position when the housing is extended.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
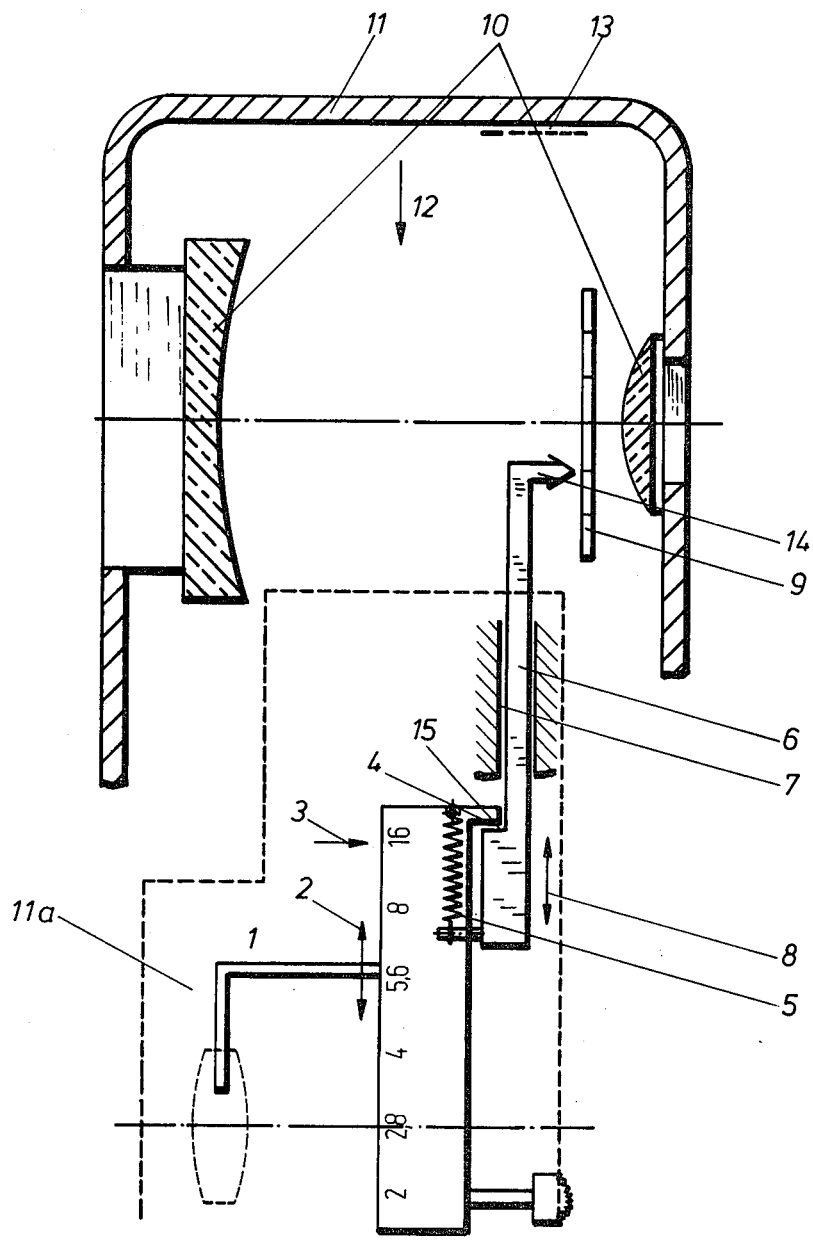
FIG. 1 is an elevational view, partially in section, of a data indicating arrangement according to the present invention.

As may be seen in FIG. 1, there is shown partially a subminiature camera having a telescoping housing and provided with a slide 1 having exposure data thereon which in this particular embodiment comprises selected or set diaphragm values. The slide is mounted for reciprocating sliding movement in the direction of the double ended arrow 2 in order to set the desired diaphragm value with respect to an indicating mark 3 provided on the camera housing. The slide 1 comprises a shoulder or stop 4 against which a projection 15 of a slideable index member 6 is urged by means of a spring 5. The index member 6 is slidably mounted for displacement in a guide 7 in the directions of the double ended arrow 8 and indicates the diaphragm value in a window 9 of a viewfinder 10. The end of the index member 6 is provided with a pointer 14 which moves with respect to a scale visible in the viewfinder 10.

The camera housing is provided with a displaceable housing part 11 which can be displaced in the direction of an arrow 12 into the telescoped position against a housing part 11a in order to reduce the overall size or volume of the camera. Upon displacement of the housing part 11, a portion 13 of the wall of the housing part will engage the end 14 of the index slide 6 and will displace the slide 6 downwardly as viewed in FIG. 1. The downward movement of the index member 6 will tension the spring 5.

When the camera housing is extended by displacing the housing part 11 upwardly as viewed in FIG. 1, the camera wall abutting portion 13 will release the index end 14 and the spring 5 will pull the index member 6 upwardly until its projection 15 abuts stop 4. Accordingly, after the displaceable housing part 11 has been displaced to its extended position as shown in FIG. 1 the index pointer 14 will again immediately indicate the diaphragm value which was previously set in the camera. It is apparent that the position of the pointer 14 with respect to the scale visible in the viewfinder 10 is determined by the position of the slide 1 upon which the selected diaphragm value is shown. Thus, telescoping of the housing part 11 or extending of the housing part 11 will move the index slide 6 but the slide 6 will always return to the position indicated by the position of the slide 1.

Figure 2:
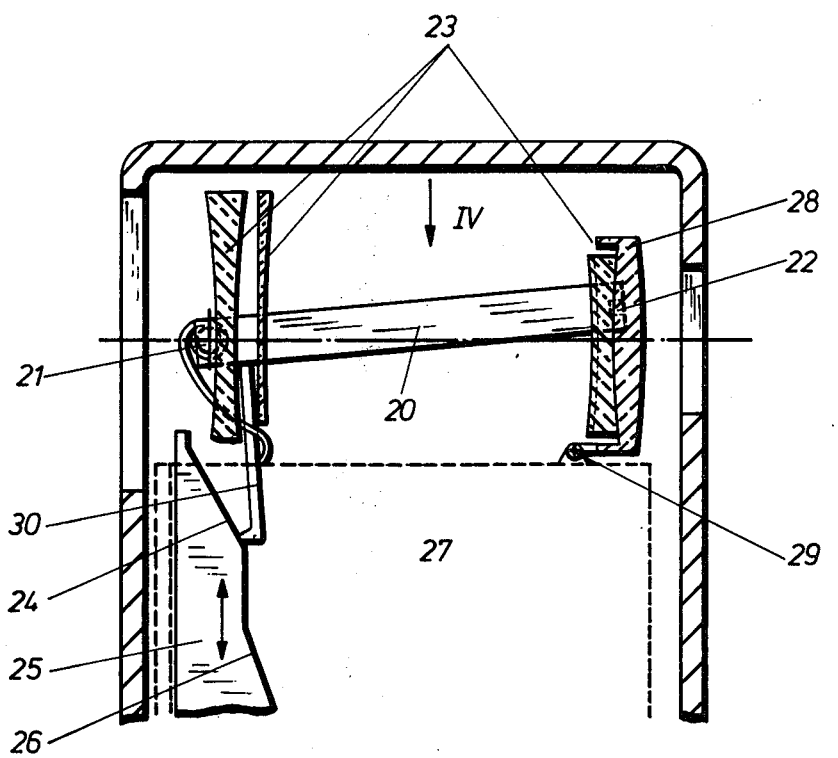
FIG. 2 is a view similar to that of FIG. 1 but showing a modification of the data indicating structure.
Figure 4:
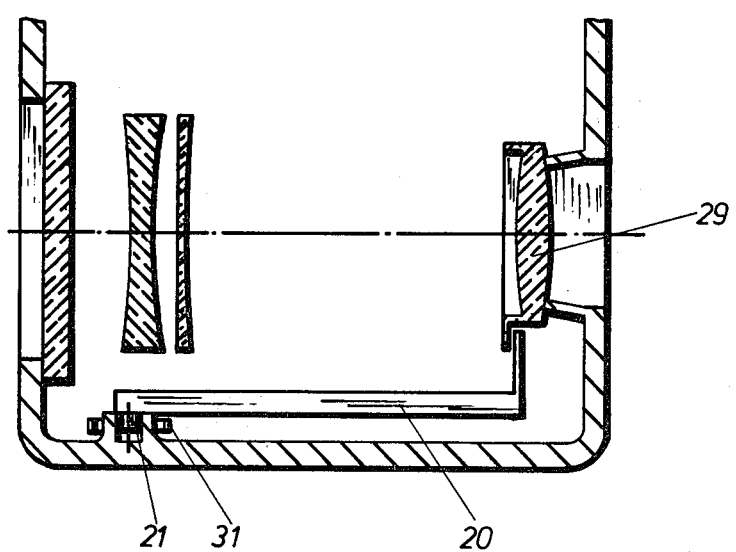
FIG. 4 is a plan view of the data indicating structure of FIGS. 2 and 3 taken in the direction of the arrow IV of FIG. 2.

In FIG. 2, there is provided an index member 20 which is pivoted about a pivot 21 formed on the inner wall of the housing part as shown in FIG. 4. The index 20 indicates in an optical viewfinder 23 the diaphragm value set in the camera by the position of an indicator mark 22 on a scale which is not shown in the drawing but is visible through the optical viewfinder 23. The index member 20 is pivoted about the pivot 21 by means of a lever arm 30 which extends rigidly from the index member 20 and slides upon an inclined cam surface 24 which is formed on a diaphragm setting slide 25.

Figure 3:
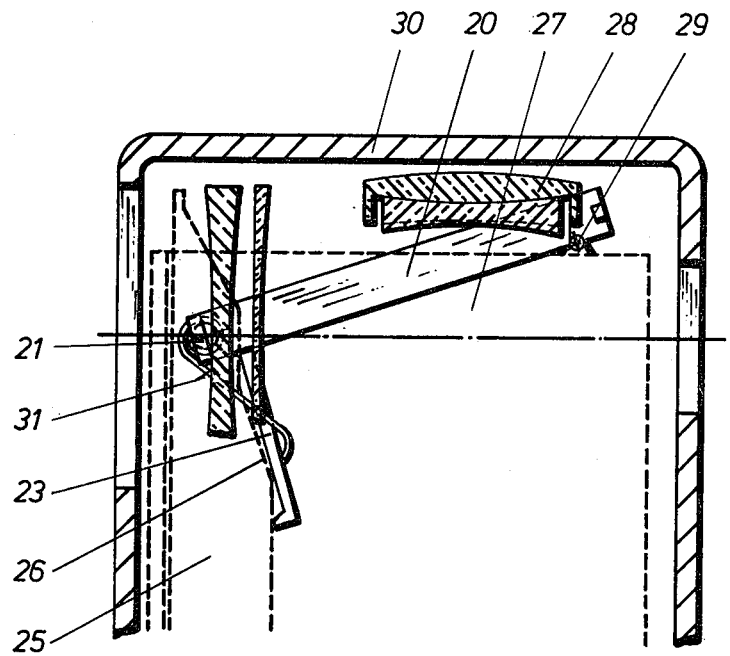
FIG. 3 is a view similar to that of FIG. 2 but showing the camera housing in the telescoped position.

The slide 25 has a second cam surface 26 shown in FIG. 3 which may also consist of an extension of the cam 24. The lever 30 will slide on the second cam surface 26 when the camera housing is telescoped. In the telescoped position, a camera part 27 will be shifted into the position as shown in FIG. 3. A lens 28 of the viewfinder is pivoted about a pivot 29 into the position shown in FIG. 3 upon telescoping of the camera housing and the index member 20 will be in the position as also shown in FIG. 3. The pivot 21 may be formed on an inner wall of camera housing part 30.

When the housing part 27 is extended outwardly with respect to the housing part 30, the index member 20 will pivot back into its indicating position as shown in FIG. 2 under the action of a spring 31 that is mounted about the pivot 21 in the housing part 30.

It is thus apparent that when the displaceable indicator element is mounted for axial displacement as shown in FIG. 1, the indicator element is coupled to the data setting slide 1 through a detachable coupling in the form of contacting stops or abutments so that upon telescoping of the camera housing, the indicator element is additionally displaced against the spring force into what may be termed a retracted position. When the camera housing is extended, the indicator element will be moved back into its previous position under the action of the spring and will immediately indicate the data set in the camera.

When the indicator element is pivoted as in FIGS. 2-4, the displaceable housing part will exert an additional pivoting movement on the indicator element when the camera housing is telescoped so that the indicator element is engageable upon an additional cam surface during the telescoping of the camera. It is to be noted that the pivot point of the pivotable indicator member is off-set and is located on a displaceable camera portion so as to facilitate pivoting of the indicator element during telescoping of the camera housing.

It will be understood that this invention is susceptible to modification in order to adapt it to different usages and conditions, and accordingly, it is desired to comprehend such modifications within this invention as may fall within the scope of appended claims.

What is claimed is:

1. A camera comprising a telescoping housing having a housing part displaceable between telescoped and extended positions, an optical viewfinder in said housing, a pivotable means for indicating data in said view finder, and means operatively connecting said indicating means to said displaceable housing part for an additional pivoting of said indicating means upon displacing said displaceable housing part to the telescoped position.

2. A camera as claimed in claim 1 and further comprising spring means for moving said indicating means into its indicating position when said housing part is displaced to the extended position.

3. A camera as claimed in claim 1 wherein said pivotable indicating means comprises a pivotable member, said displaceable housing part additional pivoting said pivotable member when said housing part is displaced to the telescoped position.

4. A camera as claimed in claim 3 and further comprising a cam acting upon said pivotable member to pivot said member.

5. A camera as claimed in claim 3 and means on a portion of said housing for defining a pivot for said pivotable member.

6. A camera as claimed in claim 1 wherein said indicating means further comprises a sliding means, said means operatively connecting said indicating means to said displaceable housing part for additional pivoting and sliding of said indicating means upon displacing said displaceable housing part to the telescoped position.

7. A camera comprising a telescoping housing having a housing part displaceable between telescoped and extended positions, an optical viewfinder in said housing, a sliding means for indicating data in said viewfinder, and means operatively connecting said indicating means to said displaceable housing part for additional sliding of said indicating means upon displacing said displaceable housing part to the telescoped position.

8. A camera as claimed in claim 7 wherein said sliding indicating means comprises a sliding member, said connecting means comprising a detachable coupling.

9. A camera as claimed in claim 8 wherein said camera further comprises means for setting data and having an abutment thereon, said detachable coupling comprising a stop on said indicating means engageable with said abutment.

10. A camera as claimed in claim 7 and further comprising spring means for moving said sliding indicating means into its indicating position when said housing part is displaced to the extended position.

* * * * *